US006675476B2

(12) United States Patent
Hostetler

(10) Patent No.: US 6,675,476 B2
(45) Date of Patent: Jan. 13, 2004

(54) SLOTTED SUBSTRATES AND TECHNIQUES FOR FORMING SAME

(75) Inventor: Timothy S. Hostetler, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 211 days.

(21) Appl. No.: 09/730,263

(22) Filed: Dec. 5, 2000

(65) Prior Publication Data

US 2002/0066182 A1 Jun. 6, 2002

(51) Int. Cl.$^{7}$ ................................................ G11B 5/127

(52) U.S. Cl. ......................... 29/890.1 ; 216/27; 216/41; 216/52

(58) Field of Search .......................... 29/890.1; 216/27, 216/41, 52, 99

(56) References Cited

U.S. PATENT DOCUMENTS

| | | | | |
|---|---|---|---|---|
| 5,317,346 A | | 5/1994 | Garcia | 346/140 R |
| 5,387,314 A | | 2/1995 | Baughman et al. | 156/643 |
| 5,441,593 A | * | 8/1995 | Baughman et al. | 216/27 |
| 5,658,471 A | | 8/1997 | Murthy et al. | 216/27 |
| 6,137,443 A | | 10/2000 | Beatty et al. | 343/63 |

FOREIGN PATENT DOCUMENTS

| | | |
|---|---|---|
| DE | 199117595 A | 12/1999 |
| EP | 0401996 A | 12/1990 |
| EP | 0841167 A | 5/1998 |
| JP | 11198387 A | 7/1999 |
| WO | WO0000354 A | 1/2001 |

* cited by examiner

*Primary Examiner*—Gregory L. Huson
*Assistant Examiner*—Peter deVore

(57) ABSTRACT

Techniques for fabricating an inkjet printhead include providing a printhead substrate, fabricating a thinfilm structure on the substrate, forming a break trench in a surface region of the substrate in which a feed slot is to be formed, and subsequently abrasively machining the substrate through the break trench to form the feed slot. The break trench can be formed by an etch process, prior to applying a barrier layer to the thinfilm structure in a preferred embodiment.

29 Claims, 7 Drawing Sheets

SLOTTED SUBSTRATES AND TECHNIQUES FOR FORMING SAME

TECHNICAL FIELD OF THE INVENTION

The present invention relates to substrates such as those used in inkjet printheads and the like.

BACKGROUND OF THE INVENTION

Various inkjet printing arrangements are known in the art and include both thermally actuated printheads and mechanically actuated printheads. Thermal actuated printheads tend to use resistive elements or the like to achieve ink expulsion, while mechanically actuated printheads tend to use piezoelectric transducers of the like.

A representative thermal inkjet printhead has a plurality of thin film resistors provided on a semiconductor substrate. A nozzle plate and barrier layer are provided on the substrate and define the firing chambers about each of the resistors. Propagation of a current or a "fire signal" through a resistor causes ink in the corresponding firing chamber to be heated and expelled through the appropriate nozzle.

Ink is typically delivered to the firing chamber through a feed slot that is machined in the semiconductor substrate. The substrate usually has a rectangular shape, with the slot disposed longitudinally therein. Resistors are typically arranged in rows located on both sides of the slot and are preferably spaced approximately equal distances from the slot so that the ink channel length at each resistor is approximately equal. The width of the print swath achieved by one pass of a printhead is approximately equal to the length of the resistor rows, which in turn is approximately equal to the length of the slot.

Feed slots have typically been formed by sand drilling (also known as "sand slotting"). This method is preferred because it is a rapid, relatively simple and scalable (many substrates may be processed simultaneously) process. While sand slotting affords these apparent benefits, sand slotting is also disadvantageous in that it causes micro cracks in the semiconductor substrate that significantly reduce the substrates fracture strength, resulting in significant yield loss due to cracked die. Low fracture strength also limits substrate length which in turn adversely impacts print swath height and overall print speed.

Other techniques include ultrasonic diamond bit drilling, abrasive sand blasting, YAG laser machining, KOH etching, TMAH etching, and dry plasma etching.

SUMMARY OF THE INVENTION

A method of fabricating an inkjet printhead is described, and includes providing a printhead substrate, fabricating a thinfilm structure on the substrate, forming a break trench in a surface region of the substrate in which a feed slot is to be formed, and subsequently abrasively machining the substrate through the break trench to form the feed slot.

BRIEF DESCRIPTION OF THE DRAWING

These and other features and advantages of the present invention will become more apparent from the following detailed description of exemplary embodiments thereof, as illustrated in the accompanying drawings, in which.

DETAILED DESCRIPTION OF THE PREFERRED EMBODIMENTS

Figure 1A:
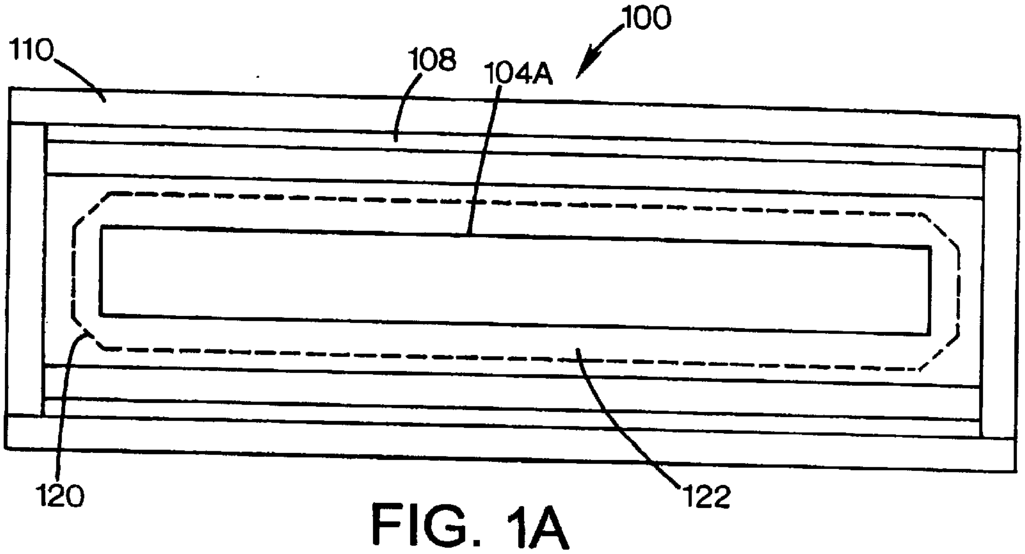
FIG. 1A is a top plan view of the printhead structure after the first step of an exemplary embodiment of a printhead fabrication process, i.e. after the inkjet thin film structure has been formed on the silicon substrate.

An exemplary embodiment of a process in accordance with aspects of this invention uses the thinfilm materials and processes heretofore employed in inkjet printhead construction. The changes to this process involve the redesign of the artwork on the photomask set to allow for the silicon wafer to be uncovered in the desired area for a TMAH (Tetra Methyl Ammonium Hydroxide) etching of the trenches in accordance with this aspect of the invention. TMAH is an anisotropic etchant for silicon. For an anisotropic etch, the etch rate is different for different crystalline planes, and thus the etch geometry is defined by the crystalline planes. This etching of the trenches happens after the thinfilm processes are complete and before the barrier material is applied. This TMAH etch process includes a few short steps:

1. Wafer Surface cleaning in the Backside Oxide Etch (BOE).
2. De-ionized water Rinse.
3. TMAH Etching.
4. De-ionized water Rinse.

The wafers are then subjected to the current processing to complete the pen construction. The abrasive drill process is tuned to match the shape and size required to work with the trench design. A simplified process flow for creating the printhead is shown below for each process.

1. Create Inkjet Thinfilm Structure
2. Perform TMAH Etch Process
3. E-test Thinfilm
4. Apply and Pattern Barrier
5. Create Inkfeed Slot with Abrasive Machining
6. Attach Orifice
7. Saw Wafer
8. Attach Printhead to Flex Circuit Steps 1 and 3–8 are the steps in the state of the art process described above. Step 2 is the new trench etch step described above.

Aspects of the invention solve several problems, including the following. The chipping that is normally caused by the abrasive machining process is contained and stopped by the parameter etch trench. In many cases, the etch trench defines the crack location site. Therefore the slot edge can be moved closer to the resistor to give a faster ink refill rate along with a low scrap rate regardless of slot width and length.

The slot or trench shape can be accurately and repeatedly defined through a photolithography process and the crystalline planes of the silicon which define the trench shape. TMAH has dramatically different etch rates for the different crystalline planes. Due to this fact, for an etching from the <100> plane at the surface of the silicon wafer, the etch will proceed down into the wafer until it reaches the <111> plane. The <111> plane is at a 53 degree angle to the <100> plane, and will therefore etch a "V" shaped notch in cross section. On the <100> plane, the <111> planes intersect at 90 degree angles, and therefore square or rectangular patterns can be readily formed to the molecular level with trenches having the "V" trench cross-section. The photolithography process which defines the trench position also allows the trench slot edge positions to be accurately and repeatedly placed.

The etched silicon trenches are shallow and etch relatively quickly. Typical wafer etching time is 20–50 minutes for a batch of 25 wafers. Typical wafer abrasive drill time is 50–70 minutes. The etch times are short enough that no significant damage occurs to the wafer edge. This process does not create sufficient heat to cause damage to surrounding thinfilms or inkjet materials.

Barrier thinning is minimized by the narrow and relatively shallow etched trench used by this process technology. The TMAH etch and relatively short etch times prevent damage to the thinfilms on the inkjet printhead. Control of the chipping outside of the etched trench minimizes thinfilm damage due to chipping.

Several exemplary trench designs are illustrated in FIGS. 1A–7, in which like reference numbers refer to like elements, and described below.

Figure 1B:
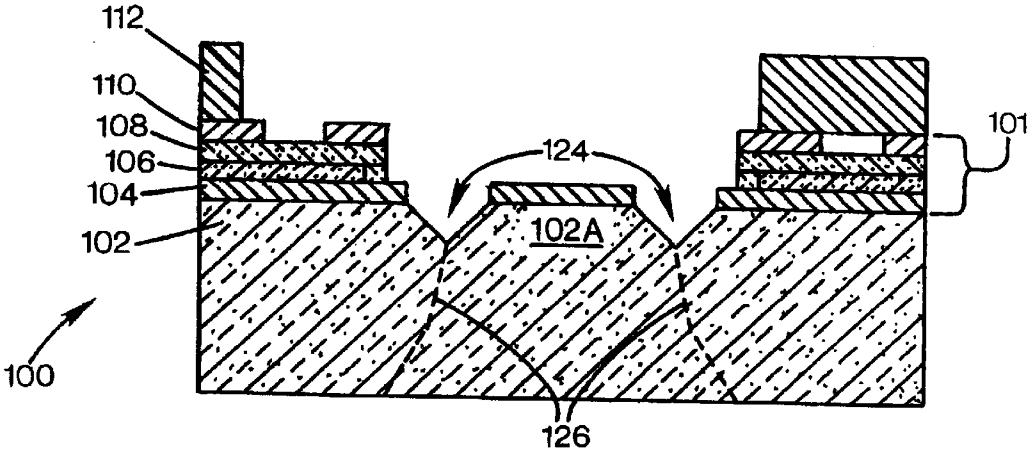
FIG. 1B is a cross-sectional view of the printhead structure of FIG. 1A after a further step of the fabrication process, the TMAH etch process, has been performed to create a slot break trench.

Break-trench Slot Embodiment (FIGS. 1A–1B). In the break-trench embodiment, a v-trench is etched around the perimeter of the ink feed slot area prior to the abrasive drill process. This trench works as a crack initiation site to control the breakthrough location for the abrasive machining, in this embodiment, an abrasive drill process. In addition, this trench stops the propagation of the shallow chipping experienced with the abrasive drill process.

FIG. 1A is a top plan view of the printhead structure 100 after the first step of the fabrication process, i.e. after the inkjet thin film structure has been formed on the silicon substrate. FIG. 1B is a cross-sectional view of the printhead structure 100 after the TMAH etch process has been performed to create a break trench and after the barrier layer 112 is applied.

The printhead structure 100 includes a silicon substrate 102 on which various patterned layers have been formed to fabricate the thin film structure, shown generally as 101 in FIG. 1B. The thin film structure details will vary in dependence on the particular printhead design. FIGS. 1A–1B illustrate in simplified form some of the patterned layers defining an exemplary thin film structure. These include a field oxide layer 104, a polysilicon layer 106, a passivation layer 108 including silicon carbide and silicon nitride layers, a tantalum layer 110 to define heating resistors for the printhead. Not shown, for example is an aluminum layer defining wiring traces.

The location of the desired feed slot for the printhead is indicated by dashed line 120 in FIG. 1A, which marks the periphery of the desired slot. The printhead material within this line 120 is to be removed to provide the feed slot for the printhead. The field oxide (FOX) layer in the area of the feed slot will serve as a mask for the TMAH etching, and has been removed in the region 122 about the line 120, in preparation for the TMAH trench etch process. The FOX layer is typically removed to obtain substrate contacts to the silicon in the thermal inkjet fabrication process. However, in the past, the FOX layer has remained in the ink feed slot area. TMAH will not etch the FOX layer, and thus the FOX needs to be selectively removed to allow the etching of the silicon substrate to occur. The photomask design for the contact etch is changed, from the prior design, so that the FOX will be removed for the substrate contacts and the break trench at the same time. This area is then kept open throughout the remaining thinfilm processing before going through the TMAH etch process to create the breaktrench.

Alternatively, instead of using the FOX layer as the mask for the TMAH etching process, the passivation layer (SiN/SiC) can be employed for this purpose. In one exemplary alternate embodiment, this passivation layer is extended so that it overlaps the edge of the FOX layer by about 3 microns.

After the TMAH etch process, a break trench 124 (FIG. 1B) is formed in the substrate 102. In an exemplary embodiment, the trench is 80 microns wide to a target depth of 58 microns, although the width and depth of the trench may be different for different slot sizes or applications. Now the remaining steps 3–8 in the fabrication process can be performed. These include the electronic testing of the thin film structure, and the application and patterning of the barrier layer 112 (FIG. 2B). The barrier layer is typically a polymer layer.

After the barrier layer is fabricated on the printhead structure, the ink feed slot is created by abrasive machining, in this case by abrasive drilling from the underside of the substrate 102 (opposite side from the thinfilm layer side) along a drill slot 126. The abrasive drilling process in an exemplary embodiment utilizes a sand blasting system that mixes a fine aluminum oxide abrasive into a high-pressure air stream. This mixture of abrasive and air is then plumed to a nozzle that is sized and shaped to create the desired cut profile in the substrate. The abrasive drilling cutting time, cutting pressure and nozzle separation for the silicon substrate is adjusted to obtain an appropriate slot through the silicon substrate.

The drill slot 126 preferably enters the bottom of the trench 124. Now the substrate material enveloped within the drill slot, indicated in FIG. 1A as 102A, is completely separated from the remainder of the substrate, and can be removed to create the feed slot for the printhead.

Now the printhead structure 100 can be passed through the remaining fabrication steps, including attachment of the orifice plate, wafer sawing and the attachment of the printhead to a flexible circuit, typically a TAB circuit, for attachment to a printhead pen body.

Figure 2A:
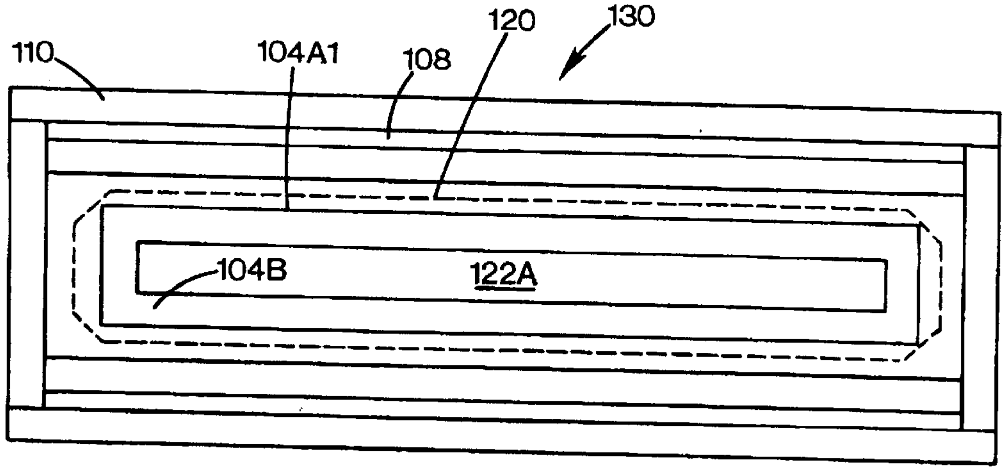
FIG. 2A illustrates in top plan view the top of the substrate after the thin film fabrication step on the substrate, for a first alternate embodiment of the fabrication process.
Figure 2B:
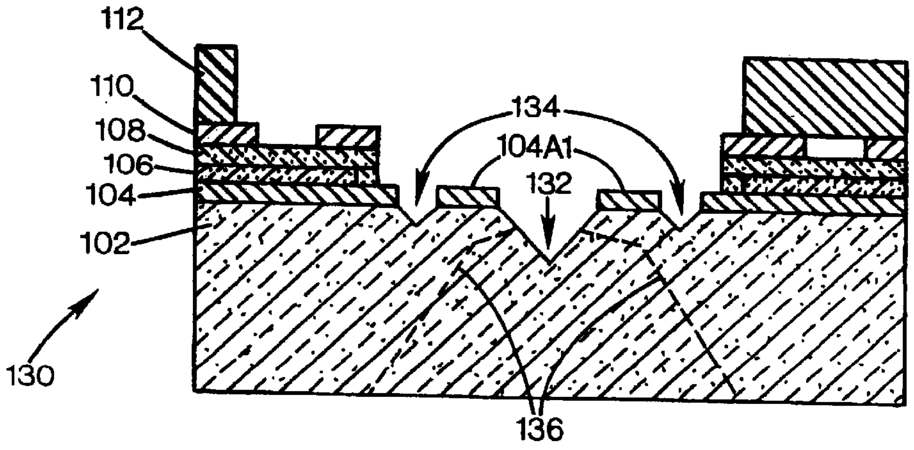
FIG. 2B is a cross-sectional view of the printhead structure of FIG. 2A, after the TMAH etch process has been performed for this alternate embodiment.

Break-trench and Drill Guide Trench Slot Embodiment (FIGS. 2A–2B). In this embodiment, the initial breakthrough occurs along a deeper "drill guide" trench and then grows out to the perimeter etch trench. The perimeter etch trench is used primarily as a chip stop feature. Thus, with this process, the sand slotting process will first break through the wafer at the location of the center trench. The sand slotting will then be continued until the through slot has grown to the size of the outer breaktrench. A chip stop feature is one that will stop the propagation of shallow chips by allowing them to be terminated by breaking through the inside wall of the trench. When the chips or cracks break through the inside wall, the chip will stop as it can not propagate the stress through the gap.

FIG. 2A illustrates in top plan view the top of the substrate 102 after the thin film fabrication step on the substrate. The structure illustrated in FIG. 2A is similar to that shown in FIG. 1A, but the field oxide layer in the center of the location of the feed slot is also removed, so that the silicon substrate surface is also exposed at 122A. The TMAH trench etch process is then performed, to define a perimeter etch trench 134 which follows the outline of dashed line 120 (FIG. 2A), as well as a deeper drill guide trench 132 in the central region 122A. In an exemplary embodiment, the perimeter trench is approximately 60 microns wide by 43 microns deep at its maximum depth, and the drill guide trench is approximately 80 microns wide by 53 microns deep at its maximum depth.

The width of the etch mask will determine the terminal depth of the trenches produced by the TMAH. This is due to the low etch rate of the <111> plane in the silicon crystalline structure. The shallow perimeter trench will reach a stopping point when the <111> planes terminate in a sharp "V". The wider center trench will not have reached this termination point and will continue to etch at the higher etch rate.

After the TMAH etch process has been performed, and the two trenches 132, 134 formed, as illustrated in FIG. 2B, the remaining steps in the fabrication process are performed. The abrasive drilling occurs along drill slot 136, and an initial breakthrough of the silicon substrate 50 occurs along the deeper drill guide trench 132. The removal of material then grows out to the perimeter etch trench 134. The size of the through trench will be determined by the mechanical sand slotting process.

Figure 3A:
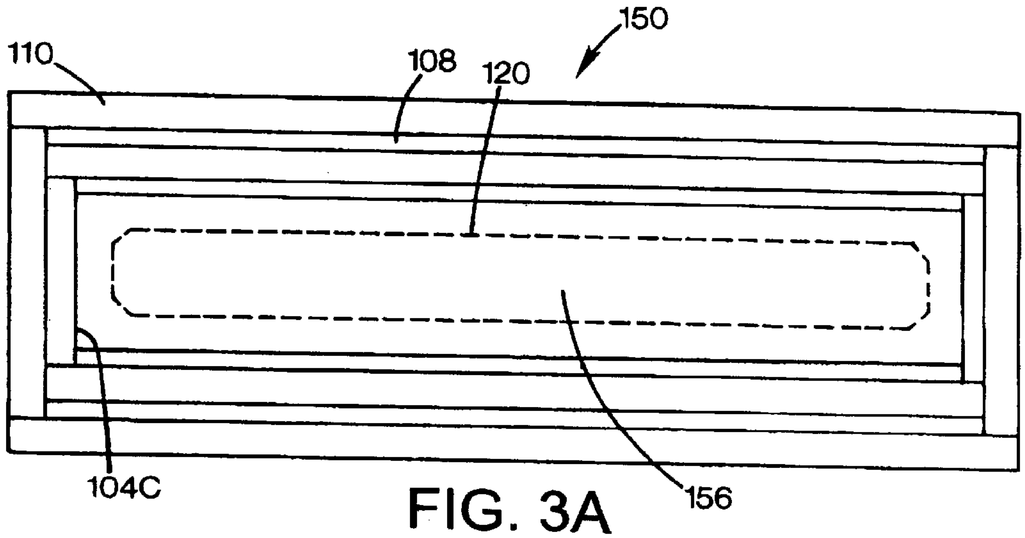
FIG. 3A illustrates in top plan view for a second alternate embodiment of a printhead fabrication process the top of the substrate after the thin film fabrication step on the substrate.
Figure 3B:
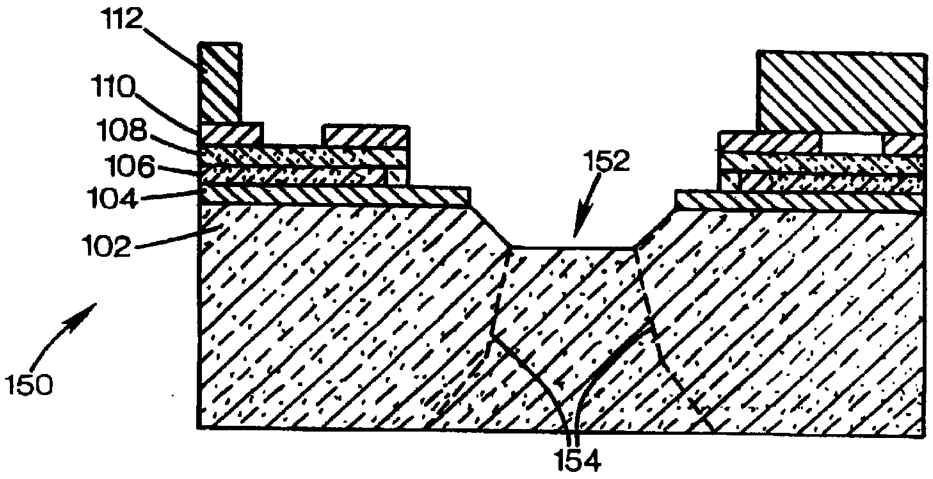
FIG. 3B is a cross-sectional view of the printhead structure of FIG. 3A, after the TMAH etch process has been performed to create a break trench.

Center-trench Full Slot Embodiment (FIGS. 3A–3B). In this embodiment, the abrasive drill slot is small enough to be placed in the center of the TMAH etch trench, and the sloped sides of the trench are used to contain the chipping and define the slot shape and position.

FIG. 3A illustrates in top plan view the top of the substrate 102 after the thin film fabrication step on the substrate. FIG. 3B shows in cross-section the substrate 102 after the TMAH etch process has been performed, and after the barrier layer 112 has been applied. The structure illustrated in FIG. 3A is similar to that shown in FIG. 1A, but the field oxide layer 104 in the location of the feed slot is also removed to near the edges, leaving border region 104C of the field oxide layer, so that the silicon substrate surface is also exposed at area 156. The TMAH trench etch process is then performed, to define an etch trench 152 which follows the outline of dashed line 120 (FIG. 3A).

After the TMAH etch process has been performed, and the trenches 152 formed, the remaining steps in the fabrication process are performed. The abrasive drilling occurs along drill slot 154, and the removal of material inside the drill slot provides the ink fill slot. This embodiment can provide a narrower fill slot than the first two embodiments in some applications.

Figure 4A:
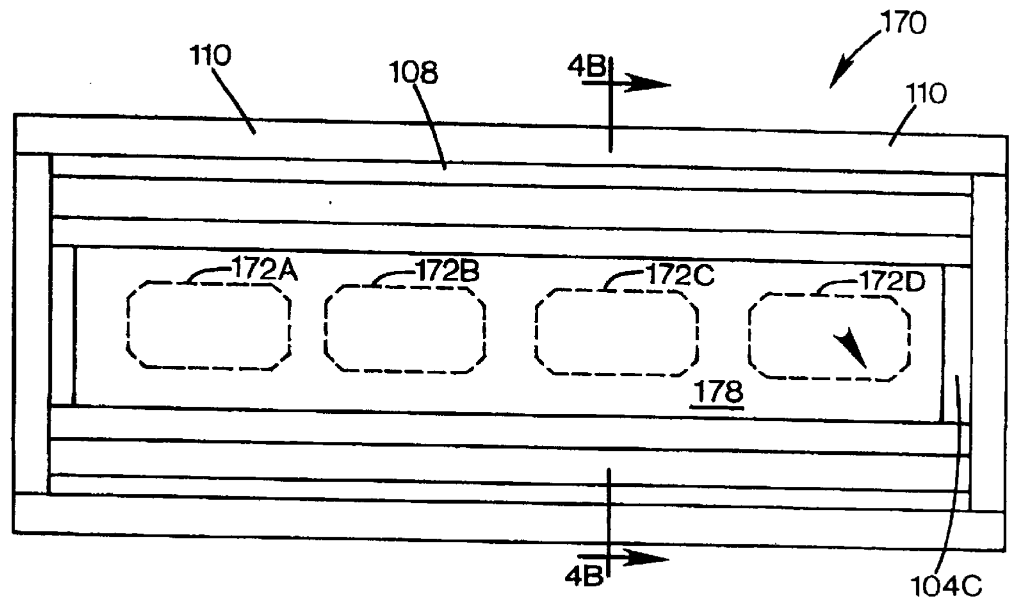
FIG. 4A illustrates in top plan view for a third alternate embodiment of a printhead fabrication process the top of the substrate after the thin film fabrication step on the substrate.
Figure 4B:
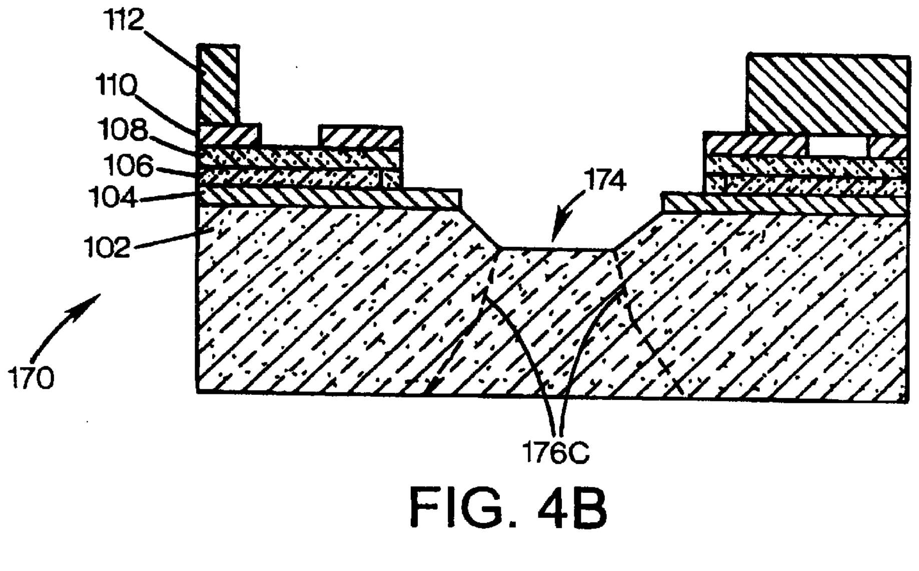
FIG. 4B is a cross-sectional view of the printhead structure of FIG. 4A, after the TMAH etch process has been performed to create a break trench and after the barrier layer is applied.

Center-trench Multiple Slot Embodiment (FIGS. 4A–4B). This embodiment is similar to the center trench embodiment described with respect to FIGS. 3A–3B, but multiple small slots are employed so that additional silicon is left in the center of the printhead die to increase die strength.

FIG. 4A illustrates in top plan view the top of the substrate 102 after the thin film fabrication step on the substrate. FIG. 4B is a cross-sectional view of the printhead structure 170 after the TMAH etch process has been performed to create a break trench and after the barrier layer 112 is applied. The structure illustrated in FIG. 4A is similar to that shown in FIG. 3A, with the field oxide layer 104 in the location of the feed slot removed to near the edges, leaving border region 104C of the field oxide layer. Dashed lines 172A–172D indicate the desired perimeters of the multiple ink feed slots. The TMAH trench etch process is then performed, to define one etch trench in the region 178.

After the TMAH etch process has been performed, and the trench 174 formed, the remaining steps in the fabrication process are performed. The abrasive drilling occurs along a drill slot for each slot location 172A–172D, including drill slot 176C for slot location 172C, and the removal of material inside the drill slots provides the multiple slots. Thus, a nozzle with a plurality of slots fed from a single source would be produced to drill the desired pattern in a single process step. In an exemplary embodiment, the small rectangular openings are approximately 200 microns wide by 1500 microns long, with 1500 microns spacing between the nozzle openings. Therefore the nozzle produces a series of smaller slots.

Figure 5A:
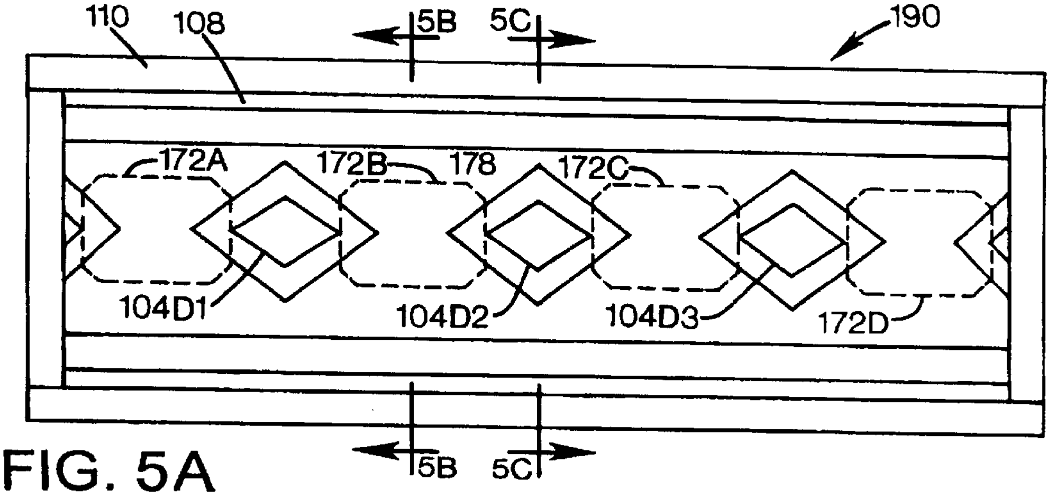
FIG. 5A illustrates in top plan view for a fourth alternate embodiment the top of the substrate after the thin film fabrication step on the substrate.
Figure 5B:
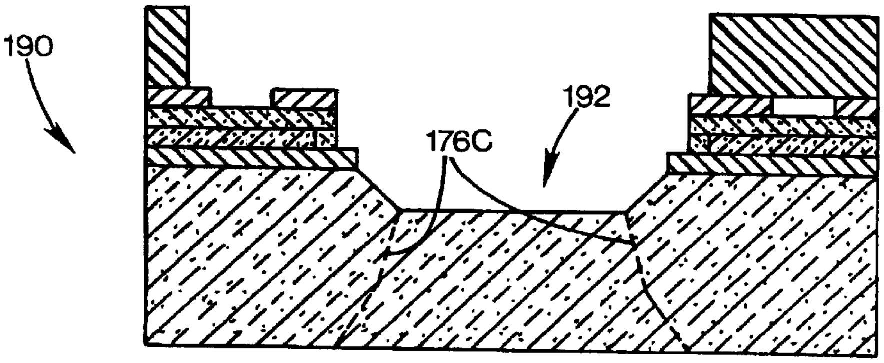
FIG. 5B is a cross-sectional view of the printhead structure of FIG. 5A taken along line 5B—5B of FIG. 5A, after the TMAH etch process has been performed to create a break trench and after the barrier layer is applied.
Figure 5C:
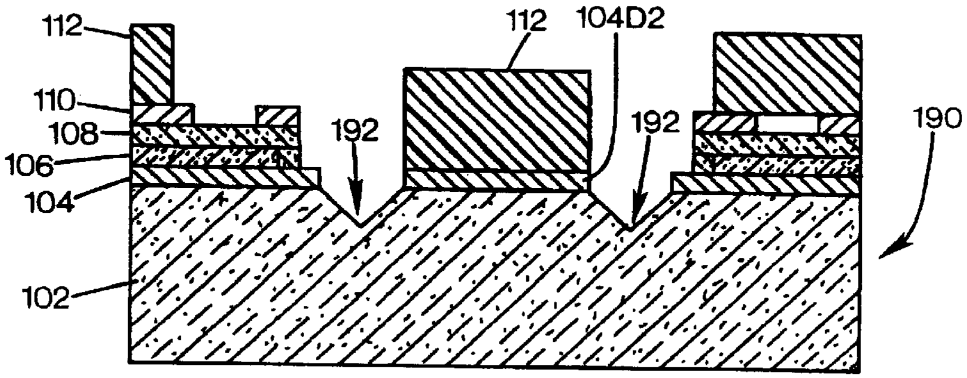
FIG. 5C is a cross-sectional view of the printhead structure of FIG. 5A taken along line 5C—5C of FIG. 5A, after the TMAH etch process has been performed to create a break trench and after the barrier layer is applied.

Island Trench Multi-slot Embodiment (FIGS. 5A–5C). In this design, Islands are left between the ink feed slots to help support the barrier, give additional die strength and promote the removal of air bubbles. The wedge shape of the island to slot edge forces the air bubbles towards the ink feed slots as they grow.

FIG. 5A illustrates in top plan view the top of the substrate 102 after the thin film fabrication step on the substrate. FIG. 5B is a cross-sectional view of the printhead structure 190 after the TMAH etch process has been performed to create a break trench and after the barrier layer 112 is applied. The structure illustrated in FIG. 5A is similar to that shown in FIG. 4A, except that pyramid-shaped islands 104D1–104D3 of the field oxide layer 104 are left in the feed slot area. These islands will mask the underlying areas of the silicon substrate from the TMAH etching process. Dashed lines 172A–172D indicate the desired perimeters of the multiple ink feed slots.

The TMAH trench etch process is then performed, to define a patterned etch trench 192 in the region 178.

After the TMAH etch process has been performed, and the trench 192 formed, the remaining steps in the fabrication process are performed. When the barrier layer 112 is applied, the barrier will cover the pyramid-shaped islands 104D1–104D3, as indicated in FIG. 5C. The abrasive drilling occurs along a drill slot for each slot location 172A–172D, including drill slot 176C for slot location 172C, and the removal of material inside the drill slots provides the multiple slots.

The island trench design uses different artwork on the FOX (hardmask) level to pattern islands in the center of the ink feed slot area. This photomask is designed to leave pyramid shaped islands in the center of the ink feed slot area, as shown in FIG. 5A. As in the foregoing embodiments, the barrier layer is then laminated and patterned, and in this case the barrier layer material is left covering the top of the pyramid-shaped islands to help support the orifice plate that is applied at a later time. The drill process is performed as in the embodiment of FIGS. 4A–4B, in that a number of small through slots are created between the islands as shown in FIG. 5B. The through slots in cross-section have a shallow trench at the center of the island that becomes deeper and wider as it approaches the cross-section at 5B–5B.

Figure 6A:
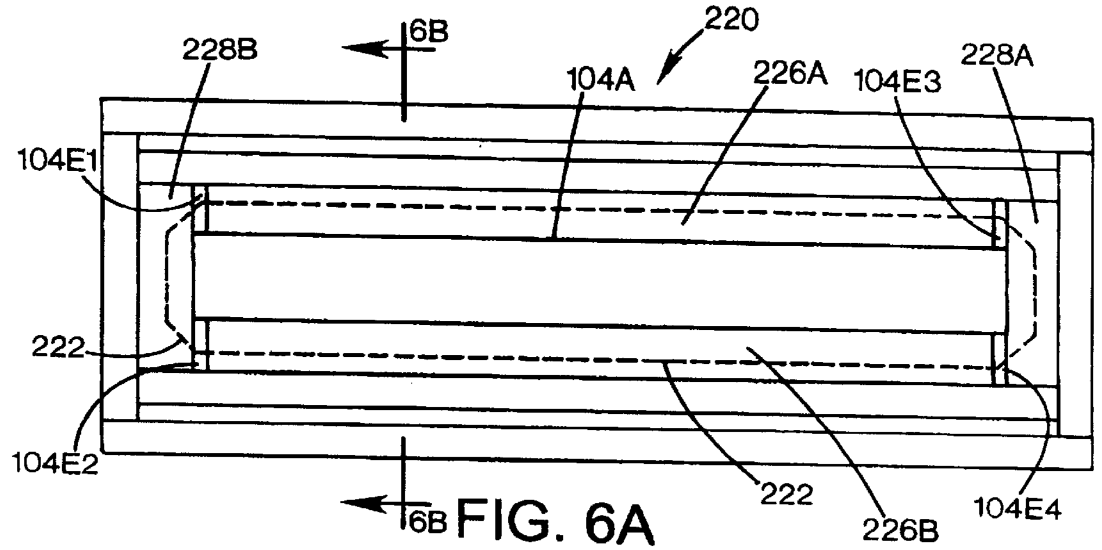
FIG. 6A diagrammatically depicts in a top view of a substrate of a further embodiment, wherein trenches serving as chip stop bars are not connected at the corners.
Figure 6B:
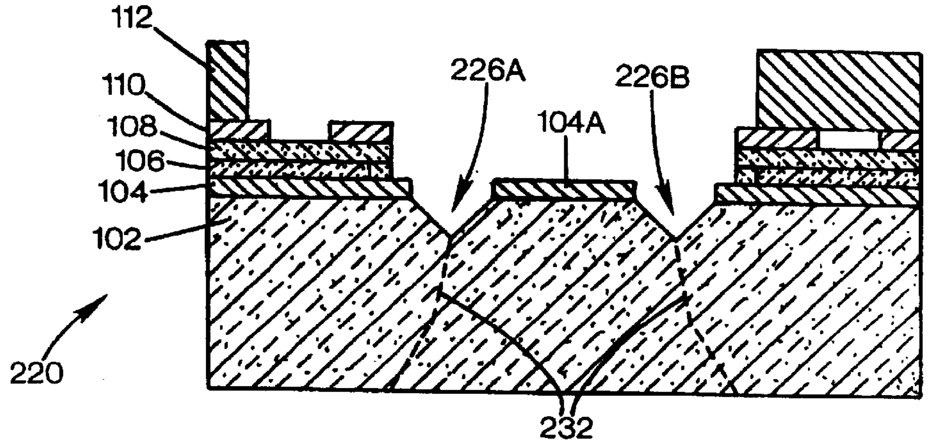
FIG. 6B is a cross-sectional view taken along line 6B—6B of FIG. 6A.

Chip Stop Bars. FIGS. 6A–6B diagrammatically depict a further embodiment, wherein trenches serving as chip stop bars are not connected at the corners. FIG. 6A is a diagrammatic top view of the substrate 220 after fabrication step 2, i.e. after the silicon substrate with the thinfilm layers have been subjected to the TMAH etching process, to form side trenches 226A, 226B and top and bottom trenches 228A, 228B. The drill slot is indicated by dashed line 222. All substrate within line 222 is to be removed during the abrasive machining process conducted along drill slot 232 (FIG. 6B) to form the feed slot. In an exemplary embodiment, the side trenches are 80 microns wide by 8300 microns long, and the top and bottom trenches are 160 microns wide by 80 microns high. The separation of the side trenches, outside to outside, is 260 microns; the separation of the top and bottom trenches, outside to outside, is 8480 microns. The trenches have a target depth of 58 microns for this embodiment.

Field oxide layer regions 104A and 104E1–E4 (FIG. 6A) provide separation definition between the side trenches 226A–226B and the top and bottom trenches 228A–228B.

The embodiment of FIG. 6A provides several advantages. Barrier thinning differences between the slot center and ends should be reduced, since the trench at the ends of the slot would not etch as deeply or as wide as in the embodiment of FIG. 1A. Protection from die chipping is still in place on all sides of the die. A possible disadvantage is that the increased number of sharply etched corners may lead to reduced die strength.

Figure 7A:
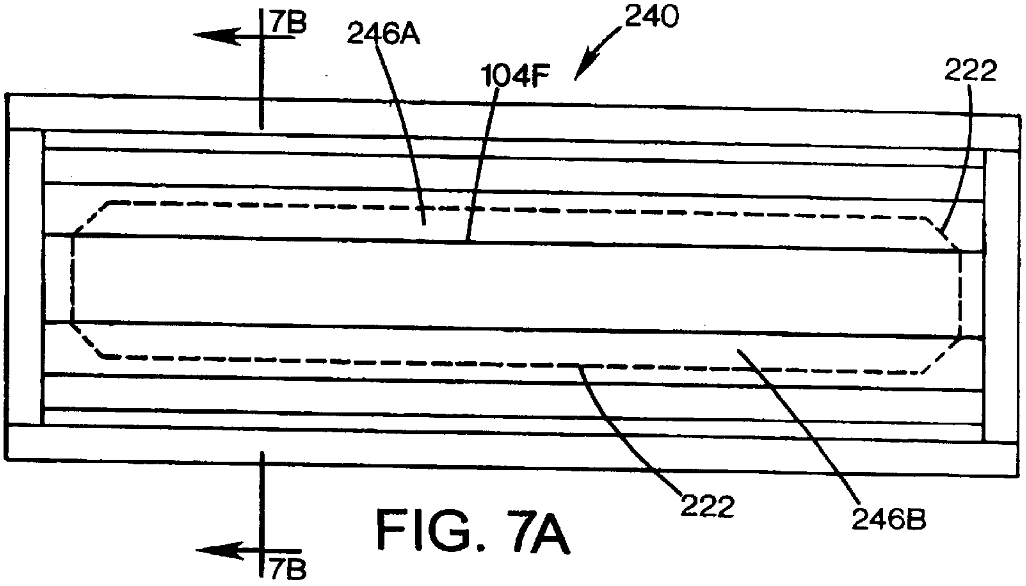
FIG. 7A illustrates in a top view a further embodiment of a break trench process, similar to the embodiment of FIG. 6A, except that the top and bottom chip stop bars are omitted.
Figure 7B:
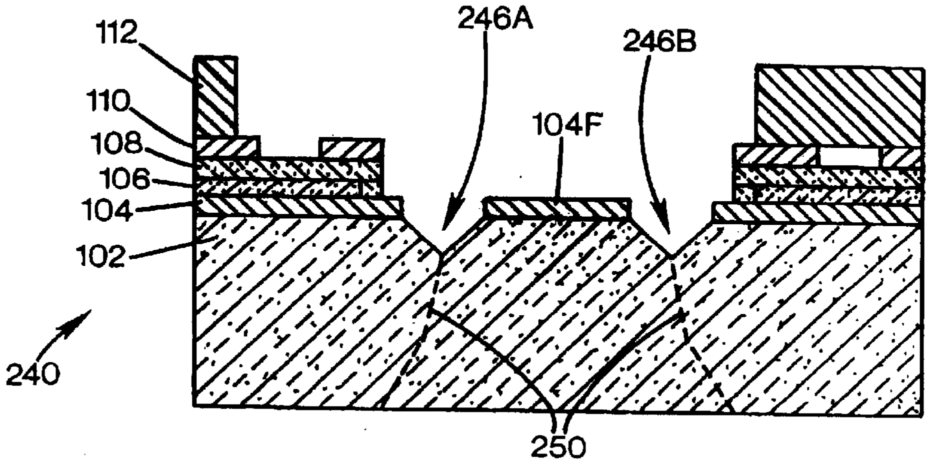
FIG. 7B is a cross-sectional view taken along line 7B—7B of FIG. 7A.

Side Trench Design. FIGS. 7A–7B illustrate a further embodiment of a break trench process, similar to the embodiment of FIGS. 6A–6B, except that the top and bottom chip stop bars are omitted. FIG. 7A is a diagrammatic top view of the substrate 240 after fabrication step 2, i.e. after the silicon substrate with the thinfilm layers have been subjected to the TMAH etching process, to form side trenches 246A, 246B. As in FIG. 6A, the nominal drill slot is indicated by dashed line 222, and in an exemplary embodiment this feature can have the same nominal size as indicated above for the exemplary embodiment described regarding FIG. 6A. For the substrate 240, only the side chip stop bars 246A, 246B are employed, and are separated by FOX layer region 104F (FIG. 7A). Thus, etch trenches are provided at both sides of the slot area, but no etch trenches are provided at the top and bottom of the slot. In one exemplary embodiment, the side trenches can have a width of 80 microns and a length of 8430 microns. In another exemplary embodiment, the trenches are left somewhat short of the end of the slot to provide increased die strength, and have a length of 8100 microns. The substrate material within line 222 is to be removed during the subsequent abrasive machining process conducted along drill slot 250 (FIG. 7B).

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method of fabricating an inkjet printhead, comprising:

providing a printhead substrate;

fabricating a thinfilm structure on the substrate;

forming a break trench structure in a surface region of the substrate in which a feed slot is to be formed;

applying a barrier layer to the thinfilm structure after forming the break trench structure; and subsequently abrasively machining the substrate through the break trench structure to form the feed slot.

2. The method of claim 1 wherein the step of fabricating the thinfilm structure includes fabricating the thinfilm structure on a first surface of the substrate, and the step of forming a break trench structure includes forming the break trench structure in the first surface of the substrate.

3. The method of claim 2 wherein the step of abrasively machining the substrate includes abrasively drilling the substrate from a second surface of the substrate to the break trench structure formed in the first surface.

4. The method of claim 1 wherein the step of forming a break trench structure includes etching the trench during an etch process.

5. The method of claim 1 wherein the step of forming the break trench structure includes forming a broad trench over the region of the feed slot.

6. The method of claim 1 wherein the ink slot includes a plurality of spaced small slots, and the step of forming the break trench structure includes forming a plurality of small trenches, one each for the spaced small slots.

7. The method of claim 6 wherein the step of abrasively machining the substrate results in a plurality of small substrate islands remaining in areas separating the small slots.

8. The method of claim 1, wherein:

the step of providing a printhead substrate includes providing a silicon substrate, and the step of forming a break trench structure includes etching the silicon substrate with a TMAH (Tetra Methyl Ammonium Hydroxide) etch process.

9. A method of fabricating an inkjet printhead, comprising:

providing a printhead substrate;

fabricating a thinfilm structure on the substrate;

forming a break trench structure in a surface region of the substrate in which a feed slot is to be formed, wherein the feed slot has a periphery;

forming a break trench structure in a surface region of the substrate in which a feed slot is to be formed, including forming a peripheral break trench around the periphery of the feed slot.

subsequently abrasively machining the substrate through the break trench structure to form the feed slot;

10. The method of claim 9 wherein the step of forming the break trench structure further includes forming a guide trench within the periphery.

11. A method of fabricating an inkjet printhead, comprising:

providing a printhead substrate;

fabricating a thinfilm structure on the substrate;

forming a break trench structure in a surface region of the substrate in which a feed slot is to be formed, including forming unconnected chip stop trench about a periphery of the to-be-formed feed slot; and subsequently abrasively machining the substrate through the break trench structure to form the feed slot.

12. The method of claim 11, wherein said unconnected chip stop trenches include left side and right side trenches bordering elongated side edges of the periphery, and top and bottom trenches bordering top and bottom edges of the periphery.

13. The method of claim 11, wherein said unconnected chip stop trenches consist of left side and right side trenches bordering elongated side edges of the periphery, and wherein no trenches border top and bottom edges of the periphery.

14. A method of fabricating a fluid ejection device, comprising:

fabricating a thinfilm structure on a first surface of a substrate;

forming a break trench structure in a surface region of the first surface of the substrate in a pattern generally circumscribing an area in which a feed slot is to be formed in the substrate, said break trench structure comprising unconnected chip stop trenches disposed about said area; and subsequently abrasively machining the substrate through the break trench structure to form the feed slot.

15. The method of claim 14 further comprising the step of applying a barrier layer to the thinfilm structure after forming the break trench structure and before abrasively machining the substrate.

16. The method of claim 14 wherein the step of abrasively machining the substrate includes abrasively drilling the substrate from a second surface of the substrate to the break trench structure formed in the first surface.

17. The method of claim 14 wherein the step of forming a break trench structure includes etching the trench during a etch process.

18. The method of claim 17, further comprising:

prior to said step of forming a break trench structure, forming a layer pattern on said first surface of the substrate of a material impervious to said etching to provide separation between said unconnected chip stop trenches.

19. The method of claim 14, wherein:

the substrate is a silicon substrate, and the step of forming a break trench structure includes etching the silicon substrate with a TMAH (Tetra Methyl Ammonium Hydroxide) etch process.

20. The method of claim 14, wherein said unconnected chip stop trenches include left side and right side trenches bordering elongated side edges of the area, and top and bottom trenches bordering top and bottom edges of the area.

21. The method of claim 20, wherein said left side and right side trenches are generally parallel to each other, and wherein said top and bottom trenches are generally parallel to each other and transverse to said left and right side trenches.

22. The method of claim 21 wherein said left and right side trenches each have a nominal longitudinal dimension of 8300 microns, and said top and bottom trenches have a nominal longitudinal extent of 160 microns.

23. The method of claim 22 wherein said left and right side trenches each have a nominal lateral dimension of 80 microns, and said top and bottom trenches have a nominal lateral extent of 80 microns.

24. The method of claim 23 wherein said left and right side trenches have respective outer edges which are separated by a nominal separation dimension of 260 microns, and wherein said top and bottom trenches have respective outer edges which are separated by a nominal separation distance of 8480 microns.

25. A method of fabricating a printhead, comprising:

fabricating a thinfilm structure on a first surface of a printhead substrate;

forming a break trench structure in a surface region of the first surface of the substrate in a pattern generally circumscribing an area in which a feed slot is to be formed in the substrate, said break trench structure comprising unconnected chip stop trenches disposed about said area, wherein said unconnected chip stop trenches include left side and right side trenches bordering elongated side edges of the area, and top and bottom trenches bordering top and bottom edges of the area, and wherein said top and bottom trenches are shorter than said left and right side trenches; and subsequently abrasively machining the substrate through the break trench structure to form the feed slot.

26. A method of fabricating an inkjet print-head, comprising:

fabricating a thinfilm structure on a wafer of a printhead substrate material for each printhead to be formed on the wafer;

forming a break trench structure in a surface region of the substrate in which a feed slot is to be formed for each printhead to be formed on the wafer, said break trench structure formed in a pattern generally circumscribing an area in which a feed slot is to be formed in the substrate, said break trench structure comprising unconnected chip stop trenches disposed about said area;

applying a barrier layer to the thinfilm structure;

subsequently abrasively machining the wafer through the break trench structure to form the feed slot for each printhead to be formed on the wafer;

attaching an orifice plate structure for each printhead to be formed on the wafer;

sawing the wafer to separate individual printheads; and attaching the printhead to printhead circuitry.

27. The method of claim 26, wherein:

the wafer is a silicon substrate wafer, and the step of forming a break trench structure includes etching the silicon substrate wafer with a TMAH (Tetra Methyl Ammonium Hydroxide) etch process.

28. The method of claim 26 wherein the step of fabricating the thinfilm structure includes fabricating the thinfilm structure on a first surface of the wafer, and the step of forming a break trench structure includes forming the break trench structure in the first surface of the wafer.

29. The method of claim 28 wherein the step of abrasively machining the wafer includes abrasively drilling the wafer from a second surface of the wafer to the break trench structure formed in the first surface.

* * * * *